Sept. 8, 1959    W. NAYLOR    2,903,123
CONVEYORS

Filed May 17, 1955    2 Sheets-Sheet 1

Inventor
WILLIAM NAYLOR
By
Mead, Browne, Schuyler & Beveridge
Attorneys

Sept. 8, 1959    W. NAYLOR    2,903,123
CONVEYORS
Filed May 17, 1955    2 Sheets-Sheet 2
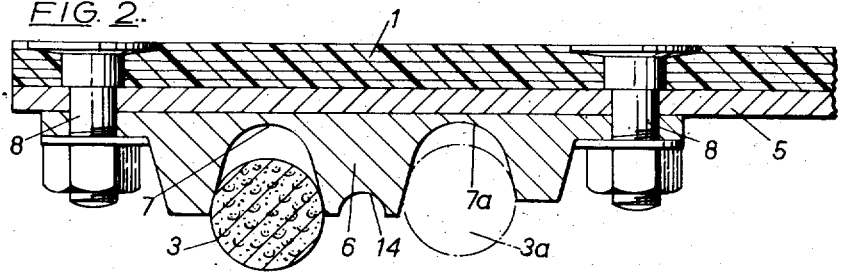
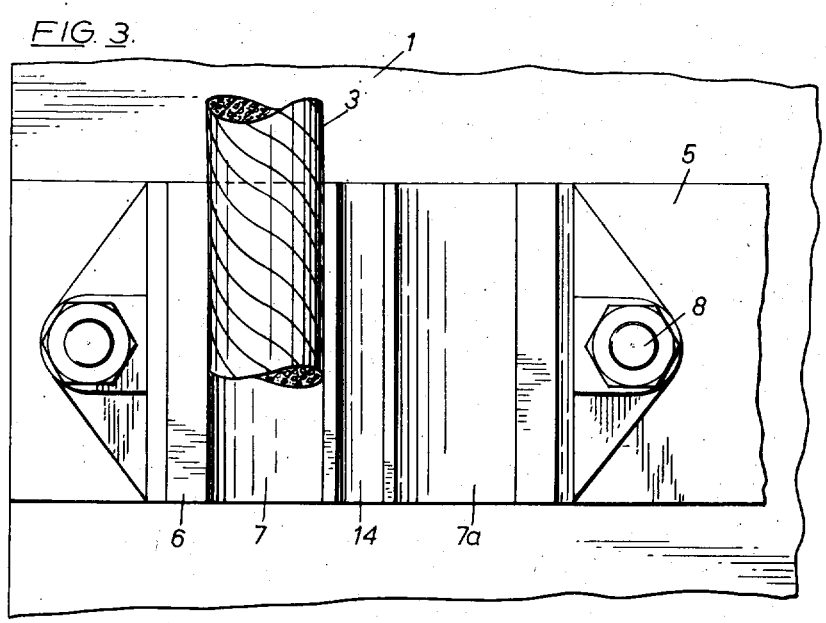
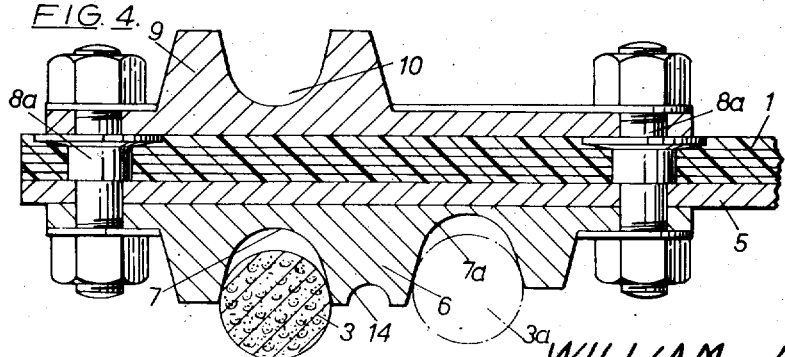

2,903,123
Patented Sept. 8, 1959

2,903,123
CONVEYORS

William Naylor, Golborne, England, assignor to Naylor Brothers Limited, Golborne, England, a British company Application May 17, 1955, Serial No. 509,066
Claims priority, application Great Britain May 20, 1954

7 Claims. (Cl. 198—191)

The present invention relates to rope or cable driven conveyors, that is to say to conveyors which are supported and driven by a rope or ropes running longitudinally of the conveyor near each edge thereof.

The conveyor itself may comprise a belt or the equivalent of a belt for example a series of flexible load carrying elements. A belt is usually to be preferred but nevertheless the term "belt" when used herein is intended to include, when the context so admits, equivalents such as a chain of flexible load carrying elements.

Rope driven and supported conveyors have the advantage that the drive is not transmitted through the belt but through the rope so that the conveyor can be much longer than when the belt transmits the drive. Moreover the belt can be supported by the rope at intervals and the rope can be supported at longer intervals. Such conveyors are driven by parallel runs of rope through jaws at opposite sides of the conveyor which engage the rope and the object of the present invention is to overcome the difficulty which arises with such conveyors that on troughing of the conveyor the jaws tend to move inwardly towards one another giving rise to lateral inward displacement of the rope and to stresses and strains incident thereto. This difficulty is overcome by the present invention which provides a conveyor belt having at opposite sides thereof at intervals along its length rope engaging jaws which project from the face of the belt and are formed so as to cause the belt to be spaced from the centre of the rope by a distance appropriate (hereinafter referred to as the "appropriate distance") to compensate for the change in transverse spacing and inclination of the jaws on troughing of the belt under its normal working load.

Said appropriate distance can readily be determined graphically by setting out on paper corresponding contours of the belt when flat and when fully troughed and then drawing normals to the like point on each contour at which the centre of a jaw is located to give an intersection of the normals which fixes an appropriate position of the rope centre for a jaw mounted at that point on the belt, the said appropriate distance being equal to the distance between the intersection and the contour of the belt. From this it will be evident that the appropriate distance is equal to the inward movement of the belt at the jaw position on troughing of the belt from its flat to its fully troughed condition corresponding to the normal working load divided by the sine of the angle of inclination of the belt at the jaw position when fully troughed.

A perpendicular line from point $2b$ to line 4, $2a$ intersects line 4, $2a$ at point $2c$. The horizontal inward displacement of the belt at the jaw position on troughing of the belt from its flat to its fully troughed condition corresponding to the normal working load is thus the distance $2b$, $2c$ and the appropriate spacing 4, $2a$ of the belt from the rope centre (corresponding also to spacing 4, $2b$) is equal to the distance $2b$, $2c$ divided by the sine of the angle $a$.

For a given conveyor belt and a given normal working load the distance $2b$, $2c$ and the angle $a$ can be readily estimated with resonable accuracy and from these values the appropriate distance 4, $2a$ can then be calculated and the rope engaging jaws can then be constructed accordingly to overcome the difficulty hereinbefore discussed.

Each pair of jaws may be mounted on or formed integral with a flexible cross member secured to or moulded into the belt and if the construction is such that the cross member lies on the face of the belt the appropriate distance may be determined graphically by setting out the position and contour of the cross member rather than the position and contour of the belt. Although the rope engaging jaws are described above as projecting from the face of the belt this language is to be taken to include the case where the rope engaging jaws project from the cross member within the width of the belt since the cross member may lie on the surface of the belt.

It is an important feature of the invention that the rope engaging jaws do not lie outside of the width of the belt. They may lie at the edge of the belt but it is preferred that they should lie somewhat spaced inwardly from the edge of the belt whereby for any given width of belt the said appropriate distance for a given degree of troughing may be the less.

Said jaws must have a recess or groove therein directed in the longitudinal direction of the belt to receive a rope and having two opposite mutually inclined faces adapted to simultaneously engage the rope. Preferably, the included angle of these jaw faces is from 25° to 35°. The jaws should be transversely spaced, when the belt is transversely flat, by a distance which is preferably equal to the spacing of the parallel runs of rope with which they engage to support the belt. When the belt is troughed the ends of the jaws nearer the belt will move inwardly so that the jaws will become oppositely inclined. A given degree of troughing of a belt of given width will require a given appropriate distance and a given maximum degree of inclination of the jaws. By arranging the jaws within the width of the belt rather than beyond the width of the belt the degree of inclination as well as the appropriate distance is reduced and the problem of avoiding fouling of the jaws with the pulleys that support the rope is simplified. Thus by means of the present invention a considerable degree of troughing of the belt can be achieved without fouling of the jaws with the rope supporting pulleys and whilst avoiding any substantial tendency on the part of the jaws to draw the supporting ropes towards one another when the belt is fully troughed.

The belt is preferably provided with jaws on opposite faces thereof so that the jaws on one face can support the belt along its load carrying upper run whilst the jaws on the other face can support the belt on its return run. These two jaws may equally spaced from the edge of the belt or alternatively they may be somewhat differently spaced from the edge of the belt depending upon the arrangement of the rope drive.

The belt may be driven by a pair or pairs of parallel endless driving ropes but is preferably driven by a single driving rope of which at one end thereof the upper run at each side is continuous with the lower run at the opposite side.

The belt is preferably provided on one face thereof at intervals along its length with pairs of jaws of different transverse spacing corresponding with changes of transverse spacing of the upper runs of a single driving rope as may arise from the use at intervals along the length of the rope of sets of multiple-ring driving pulleys for driving the rope at intervals along its length from separate prime movers or corresponding to the spacing of the upper runs of a series of main driving ropes and the spacing of a series of auxiliary transfer ropes serving to transfer the belt from one driving rope to the next, The said flexible cross members should preferably be designed to give a predetermined degree of troughing under a given load and the troughed contour of the cross members when under load may be determined within limits by the form of the cross members and the nature of the material thereof. Thus the cross sectional area of the cross members may vary in the longitudinal direction thereof i.e. in the transverse direction of the belt, to afford a varying moment of inertia along the length of the cross members and thus a given transverse contour thereof under load. For example the cross members may be of maximum width at the middle of the belt and of decreasing width towards the edges of the belt.

The invention is further described by way of example with reference to the accompanying drawings in which:

Fig. 2 is a fragmentary illustration of one embodiment of the invention.

Fig. 3 is an underside view corresponding to Fig. 2.

Fig. 4 illustrates a second embodiment and

Figure 1:
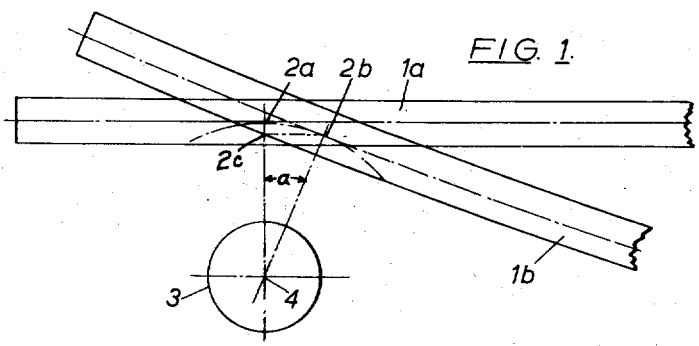
Fig. 1 is a diagram illustrating how the aforesaid appropriate distance can be discovered.

Fig. 1 illustrates how the appropriate spacing between the belt and rope centres may be determined. The end of a transverse section of the belt is represented in an unloaded and loaded condition respectively at 1a and 1b. The point 2a represents a point on the median plane of the belt which will lie vertically above the centre of a supporting rope 3 when the belt is in its unloaded condition. The point 2b is the position to which the point 2a will move when the belt is in its loaded position 1b. Perpendiculars to the belt contours are drawn at the points 2a and 2b and produced to their point of intersection 4. The point 4 is thus the centre of rotation of the point 2, as the belt is loaded and unloaded and is hence the appropriate centre of the rope 3 from which the aforesaid appropriate spacing can be determined.

In the embodiment of Figs. 2 and 3 the belt 1 has a cross-strap or member 5 of spring steel which is clamped to the underside of the belt between the belt and a jaw body 6 in which is formed a pair of rope engaging jaws 7 and 7a. The clamping is achieved by two bolts 8 passing through the belt 1, cross-strap 5 and the flanges of the body 6. The cross-straps are arranged at spaced intervals along the length of the belt, each cross-strap having a jaw body such as 6 at each of its ends. The belt is shown supported and driven by the engagement of the jaw 7 on the rope 3. However it may be equally well supported by the jaw 7a engaging on the rope 3 in the position 3a shown in chain dotted lines. The radius of rotation of a point on the belt, as the belt troughs, becomes less as the point is situated nearer the centre of the belt. Hence the appropriate spacing of the rope centre from the belt surface at the position 3a is less than at the position 3. The provision of two jaws 7, 7a at each side of the belt enables the belt to be transferred from one rope to another or from one section of a rope to an adjacent section where the upper runs are differently spaced transversely.

In the embodiment of Fig. 4 a further flanged jaw body 9 having a single jaw 10 is clamped to the upper surface of the belt 1 by the bolts 8a. The jaw 10 is intended to engage with a lower run of the rope when that part of the belt is passing along its return run. As the jaw 10 thus only supports the belt when in its unloaded condition its design is not necessarily restricted to the same condition as the design of the main driving jaws 7 and 7a.

Figure 5:
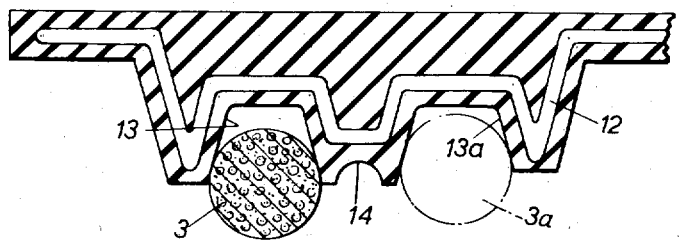
Fig. 5 illustrates a third embodiment.

In the embodiment of Fig. 5 the jaws 13, 13a are moulded on the face of the belt and the belt and jaws are reinforced transversely by a metal strip 12 moulded into the belt and following the shape of the jaws at its ends. The alternative positions of the supporting rope or ropes are indicated by the numerals 3, 3a.

The recess 14 between the jaws 7 and 7a shown in Figs. 2, 3 and 4 and between the jaws 13 and 13a shown in Fig. 5 is to provide clearance with the peripheral edge of a pulley supporting and/or driving the rope 3 when the belt is supported thereon in a troughed condition.

The jaws of the embodiments shown are illustrated as having an included jaw angle of approximately 30°. It has been found in practice that the preferable range of jaw angle is from 25° to 35°.

I claim:

1. A conveyor belt adapted to be supported and driven by a rope running longitudinal below the belt adjacent each edge thereof, a plurality of rope engaging jaws secured to and projecting from the bottom face of said belt, each of said jaws having two mutually outwardly inclined jaw faces for simultaneous engagement with said rope, said belt being spaced from the axial center of a rope engaged by said jaws faces by a distance substantially equal to the horizontal inward displacement of the belt at the jaw position on troughing of the belt from its flat to its fully troughed condition corresponding to the normal working load divided by the sine of the angle of inclination of the belt at the jaw position when fully troughed.

2. A conveyor belt according to claim 1 in which the included angle between said mutually outwardly inclined jaw faces is from 25° to 35°.

3. A conveyor belt according to claim 1 in which the included angle between said mutually outwardly inclined jaw faces is about 30°.

4. A conveyor belt according to claim 1 in which the rope engaging jaws are spaced inwardly from the longitudinal edges of the belt.

5. A conveyor belt according to claim 3 in which the rope engaging jaws are spaced inwardly from the longitudinal edges of the belt.

6. A conveyor belt adapted to be supported and driven by a rope running longitudinally below the belt adjacent each edge thereof, a plurality of flexible, transversely disposed cross-members secured to and spaced at intervals along the length of said belt, a plurality of rope engaging jaws secured to and projecting from the bottom face of said belt and coincident with said cross-members, each of said jaws having two mutually outwardly inclined jaw faces for engaging said rope, said belt being spaced from the axial center of a rope engaged by said jaw faces by a distance substantially equal to the horizontal inward displacement of the belt at the jaw position on troughing of the belt from its flat to its fully troughed condition corresponding to the normal working load divided by the sine of the angle of inclination of the belt at the jaw position when fully troughed.

7. In a conveyor system including a conveyor belt supported and driven by a rope running longitudinally below the belt adjacent each edge thereof, the improvement which comprises a plurality of rope engaging jaws secured to and projecting from the bottom face of said belt at opposite sides thereof, each of said jaws having two mutually outwardly inclined jaw faces for engaging said rope, said belt being spaced from the axial center of said rope held between said jaw faces by a distance substantially equal to the horizontal inward displacement of the belt at the jaw position on troughing of the belt from its flat to its fully troughed position corresponding to the normal working load divided by the sine of the angle of inclination of the belt at the jaw position when fully troughed.

References Cited in the file of this patent

UNITED STATES PATENTS

| | | |
|---|---|---|
| 2,732,930 | Thomson | Jan. 31, 1956 |

FOREIGN PATENTS

| | | |
|---|---|---|
| 601,625 | Great Britain | May 10, 1948 |
| 1,083,487 | France | June 30, 1954 |